United States Patent
Carpenter et al.

(10) Patent No.: US 6,260,048 B1
(45) Date of Patent: Jul. 10, 2001

(54) RESOLUTION OF INCIDENTS WHICH OCCUR DURING THE USE OF A PRODUCT

(75) Inventors: Ralph Carpenter, Colfax; Richard F. DeGabriele, Citrus Heights, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/181,136

(22) Filed: Oct. 27, 1998

(51) Int. Cl.[7] .................................................. G06F 17/30
(52) U.S. Cl. .......................... 707/104; 706/45; 706/10; 706/101; 714/26
(58) Field of Search .............. 707/104, 10, 101; 701/29, 39; 706/45; 714/26

(56) References Cited

U.S. PATENT DOCUMENTS

| | | | |
|---|---|---|---|
| 5,107,497 | * | 4/1992 | Lirov et al. ............................. 714/26 |
| 5,159,685 | * | 10/1992 | Kung ...................................... 714/26 |
| 5,216,612 | * | 6/1993 | Cornett et al. ...................... 364/468 |
| 5,272,704 | * | 12/1993 | Tong et al. ............................ 371/23 |
| 5,446,885 | * | 8/1995 | Moore et al. ....................... 707/104 |
| 5,539,869 | * | 7/1996 | Spoto et al. ......................... 345/346 |
| 5,905,989 | * | 5/1999 | Biggs ................................... 707/104 |
| 5,931,877 | * | 8/1999 | Smith et al. ........................... 701/29 |
| 5,961,561 | * | 10/1999 | Wakefield, II ........................ 701/29 |
| 5,974,349 | * | 10/1999 | Levine .................................. 701/29 |
| 6,067,486 | * | 5/2000 | Aragones et al. ..................... 701/29 |
| 6,125,312 | * | 9/2000 | Nguyen et al. ........................ 701/35 |

OTHER PUBLICATIONS

Bill Dyzell, Oil Changes Tunes Up Your PC, Internet Web Page, URL: www.cybermedia.com, 1998.

CyberMedia Debuts Internet Enabled ActiveHelp™ With New First Aid® 98. Press Release, Sep. 3, 1998, from Cybermedia, Inc., 3000 Ocean Part Boulevard Suite #2002, Santa Monica, CA 90405.

* cited by examiner

Primary Examiner—Paul R. Lintz

(57) ABSTRACT

A technical support incident resolution facility handles incidents, which are unexpected results which occur during the use of products. Within a vendor environment, a diagnostic knowledge trees database stores diagnostic knowledge trees for the products. A copy of a subset of the diagnostic knowledge trees is downloaded to a client environment. The subset of diagnostic knowledge trees provides diagnostic information for a subset of the products which are supported within the client environment. The copy of the subset of the diagnostic knowledge trees are used to supply diagnostic information to the client for incidents which potentially occur when a diagnostic program attempts to analyze the subset of the products.

18 Claims, 3 Drawing Sheets

RESOLUTION OF INCIDENTS WHICH OCCUR DURING THE USE OF A PRODUCT

BACKGROUND

The present invention concerns delivering diagnostic services to a client and pertains particularly to the resolution of incidents arising in the course of those diagnostic procedures.

During the execution of a computer software program on a computing system, faults or other unexpected conditions are sometimes encountered. Certain classes of conditions may be anticipated by the computer software program itself and so appropriate corrective action can be taken. However, there is another class of faults that the computer software program cannot anticipate—usually a condition arising from the interaction in unexpected ways of the computer software program with the operating environment in which the computer software program is run. When this occurs, the user of the computer system can become dissatisfied with the business impact of the fault. The client or a help desk analyst then reports the fault to the vendor's customer support organization—or to the customer support organization of the vendor of a related hardware or software product.

Sometimes the vendor who receives the technical support call is unable to resolve the client's problem. One reason that the vendor may be unable to resolve the problem is that insufficient symptoms were reported by the client. Another reason could be that the problem—although appearing to the client to be caused by the vendor's product—is, in fact, caused by the product interacting with a related product. The related product is often produced by a different vendor.

Communication between the client and the vendors is generally done over the telephone or via electronic mail. Subsequent communication between/among multiple vendors is done via telephone, electronic mail, or electronic transactions directly between the vendors' technical support applications. When technical support applications electronically transfer information about an incident, it is generally necessary for the sending technical support application and the receiving technical support application to use a translator module that performs the translations between the internal application formats used by each vendor. In some cases an intermediate transaction format will have been defined that is acceptable to the interacting technical support applications. Although industry standards exist for the exchange of support information, only a few help desk and technical support center application packages have been extended to implement the standards, therefore few vendors currently have this capability.

Application programs are available to help vendors track reported incidents and for determining the source of faults. Examples of such application programs include, the Clarify ClearSupport application program, available from Clarify Inc., having a business address of 2125 O'Nel Drive, San Jose, Calif. 95131, the Vantive Support application program available from Vantive Corporation having a business address of 2455 Augustine Drive, Santa Clara, Calif. 95054, and the Remedy Action Request System application program available from Remedy Corporation having a business address of 1505 Salado Drive, Mountain View, Calif. 94043. Also there are end-user applications that are, in fact, diagnostic packages that enable a client to analyze and attempt to repair their own PC: The Oil Change utility program and the Active Help Center FirstAid Internet extension, both available from Cybermedia, Inc., which has a business address of 3000 Ocean Park Blvd., Ste. 2001, Santa Monica, Calif. 90405. These application programs provide automatic service and support software that automatically detect, diagnose and repair most common problems that occur on personal computers which are running the Windows 95 operating system available from Microsoft Corporation, having a business address at 16011 NE 36th Way, Redmond, Wash. 98073-9717. These application programs, however, do not capture the fault description and diagnostic analysis within a trouble ticket package.

BRIEF SUMMARY OF THE INVENTION

In accordance with the preferred embodiment of the present invention, a technical support incident resolution facility is presented. The incidents arise from unexpected results which occur during the diagnosis of fault conditions in a vendor's products within a client environment. Within a vendor environment, a diagnostic knowledge trees database stores diagnostic knowledge trees for the vendor's products and platforms. A copy of a subset of the diagnostic knowledge trees is downloaded to a diagnostic facility within the client environment. The subset of diagnostic knowledge trees provides diagnostic information for a subset of the products utilized in the client environment which are supported (e.g., in accordance with a support agreement) by the vendor's technical support organization. The copy of the subset of the diagnostic knowledge trees are used to supply diagnostic information to a diagnostic program that operates in the client environment and analyzes conditions potentially occurring when the diagnostic program analyzes fault conditions with the supported subset of the products.

In the preferred embodiment, leaf nodes within the diagnostic knowledge trees each include a question and at least one response and possibly a resolution of the fault condition.

Also in the preferred embodiment, when diagnostic information provided by the copy of the subset of the diagnostic knowledge trees is not sufficient to solve a problem encountered by the diagnostic program, a trouble ticket is formed which describes the problem encountered by the diagnostic program. The trouble ticket is lodged with the client's help desk system, if such a system exists, so that the client's internal support organization can attempt to resolve the reported fault condition. If not, the trouble ticket is forwarded to a technical support system within the vendor environment—located on the Internet and outside the client's firewall. The vendor's technical support organization, upon providing a solution to the problem encountered by the diagnostic program, updates the diagnostic knowledge trees database to reflect the solution provided to the client. The copy of the subset of the diagnostic knowledge trees can then be refreshed by downloading, from the vendor environment to the client environment, any changes that have been made to the subset of the diagnostic knowledge trees. Alternatively, the copy of the subset of the diagnostic knowledge trees can be refreshed by downloading, from the vendor environment to the client environment, a new copy of the subset of the diagnostic knowledge trees.

The present invention provides significant repair assistance for faulty programs directly in the client environment, thus paving the way for self-healing software that depends upon the ability to have problems reported, solved, and replaced without the client having to become involved in the problem solving process.

DETAILED DESCRIPTION OF THE PREFERRED EMBODIMENT

Figure 1:
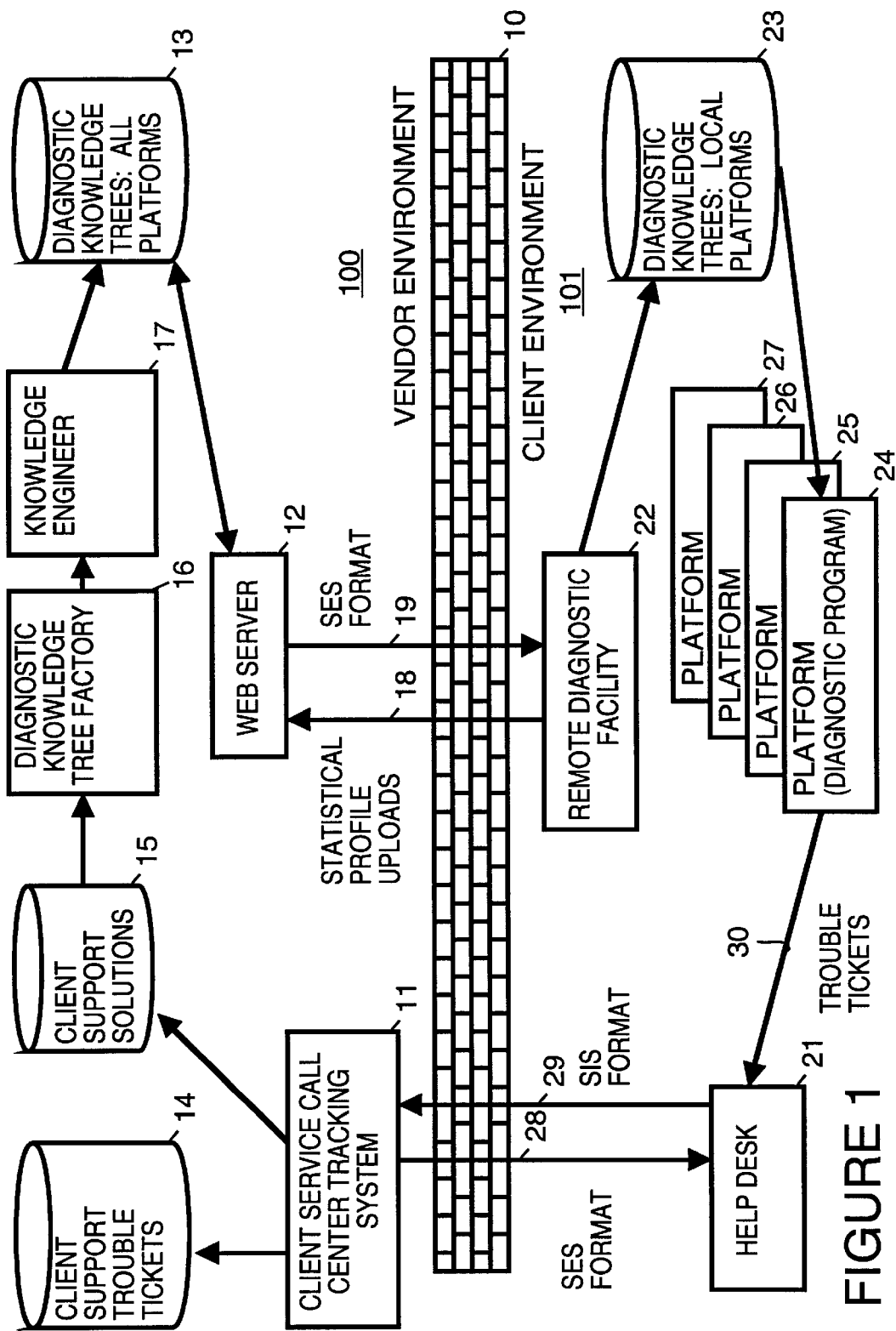
FIG. 1 shows a technical support incident resolution facility in accordance with a preferred embodiment of the present invention.

FIG. 1 shows a technical support incident resolution facility in accordance with a preferred embodiment of the present invention.

A wall 10 represents the separation between a vendor environment 100 and a client environment 101.

A web server 12 within vendor environment 100 serves as an access point for in-bound requests for technical support as well as a point of disseminating out-bound support services. In FIG. 1, web server 12 is shown as a distribution point for diagnostic knowledge trees (DKT) within a diagnostic knowledge trees database 13. A copy of the diagnostic knowledge trees database is distributed to a remote diagnostic facility 22 within client environment 101, as illustrated by an arrow 19.

Remote diagnostic facility 22 forwards to web server 12 statistical profile uploads, as represented by an arrow 18. Statistical profile uploads are adjustments in the ordering of diagnostic questions based upon actual diagnostic experience.

A knowledge engineer 17 creates diagnostic knowledge trees within diagnostic knowledge trees database 13 based upon incident resolutions, as the incident resolutions are presented by a diagnostic knowledge tree factory 16. The incident resolutions include, for example, collections of problem resolutions, product usage notes, engineering notes, service notes, and other product documentation.

The incident resolutions are processed by diagnostic knowledge tree factory 16 before the incident resolutions are presented to knowledge engineer 17. A processing engine within diagnostic knowledge tree factory 16 analyzes the incident resolutions, searching for diagnostic sequences. For example, a diagnostic sequence may be the following statement by a technical support analyst to a client: "I asked the client X and she replied Y, so I asked Z". When diagnostic knowledge tree factory 16 locates a likely sequence, the sequence is reported to knowledge engineer 17. Knowledge engineer 17 decides the relevance of suggested diagnostics sequence to creating new diagnostic knowledge trees and/or modifying existing diagnostic knowledge trees.

To assist knowledge engineer 17, diagnostic knowledge tree factory 16 displays recommended queuing sequences as they appear in the base solution, allowing knowledge engineer 17 to reword and/or reorder the questions, responses, & resolutions based on the domain expertise of knowledge engineer 17.

A technical support call center tracking system 11 is responsible for keeping tabs on trouble tickets submitted to a call center. One source of in-bound trouble tickets is a help desk 21 system, located within client environment 101. As illustrated by an arrow 29, a trouble ticket is escalated to technical support call center tracking system 11 using the industry standard Service Incident Exchange Standard (SIS).

Once a trouble ticket has been escalated and submitted into technical support call center tracking system 11, technical support analysts using a trouble ticket tracking system in technical support call center tracking system 11 can begin developing a resolution to the client's problem as represented by the trouble ticket. Such resolutions are stored as incident resolutions.

As illustrated by an arrow 28, incident resolutions are also transmitted from the technical support call center tracking system 11 to help desk 21. This is done, for example, using the industry standard Solution Exchange Standard (SES).

A help desk sometimes exists on the client's premises. For example, help desk 21 is shown in FIG. 1. Help desk 21 serves a purpose similar to that of technical support call center tracking system 11. That is, both help desk 21 and technical support call center tracking system 11 manage trouble tickets.

Diagnostic programs are represented in FIG. 1 by a platform 24, a platform 25, a platform 26 and a platform 27. When a diagnostic program operating on one of platforms 24–27 logs a trouble ticket that reflects some disparity with one or more diagnostic knowledge trees, the diagnostic program and remote diagnostic facility 22 collaborate before lodging a trouble ticket with the help desk 21. The collaboration is needed because not every client organization maintains its own help desk, and not every diagnostic knowledge tree disparity warrants a trouble ticket.

Remote diagnostic facility 22 accepts diagnostic knowledge trees as they arrive from web server 12, as represented by arrow 19. The diagnostic knowledge trees are formatted in the industry standard Solution Exchange Standard (SES) format. Only a subset of diagnostic knowledge trees are downloaded. Only diagnostic knowledge trees are downloaded that match the platforms (i.e., local platforms) to which the client has pre-arranged diagnostic service. The down loaded diagnostic knowledge trees are stored within a diagnostic knowledge trees database 23. Within client environment 101, diagnostic knowledge trees for platforms 24 through 27 are stored in diagnostic knowledge trees database 23 because these diagnostic knowledge trees match those to which the client is entitled. In this way a single diagnostic knowledge trees database can serve several different diagnostic programs on many platforms. The diagnostic knowledge trees within diagnostic knowledge trees database 23 can additionally be indicated by platform.

When a fault incident arises, the diagnostic program can use the diagnostic knowledge trees within diagnostic knowledge trees database 23 to try to resolve the incident. Such a use of the diagnostic knowledge trees is called a diagnostic test. When performance of a diagnostic test fails to resolve a problem experienced by a diagnostic program, the diagnostic program on platform 24 lodges a trouble ticket (in collaboration with remote diagnostic facility 22) with help desk 21. The trouble ticket reflects the fact that the diagnostic test failed, augmented with a description of the symptom(s) of the failure as well as other automatically collected relevant information.

As described above, in vendor environment 100. when the vendor supplies an incident resolution for the incident set out in the trouble ticket, this can result in an update to diagnostic knowledge trees database 13. This update is communicated to diagnostic knowledge trees database 23 when the information in diagnostic knowledge trees database 13 is used to refresh diagnostic knowledge trees database 23. This refreshing is performed, for example, by downloading to diagnostic knowledge trees database 23 changes made to diagnostic knowledge trees database 13. Alternatively, this refreshing is performed, for example, by downloading to diagnostic knowledge trees database 23 new copies of all (or an appropriate subset) of the diagnostic knowledge trees stored in diagnostic knowledge trees database 13.

Figure 2:
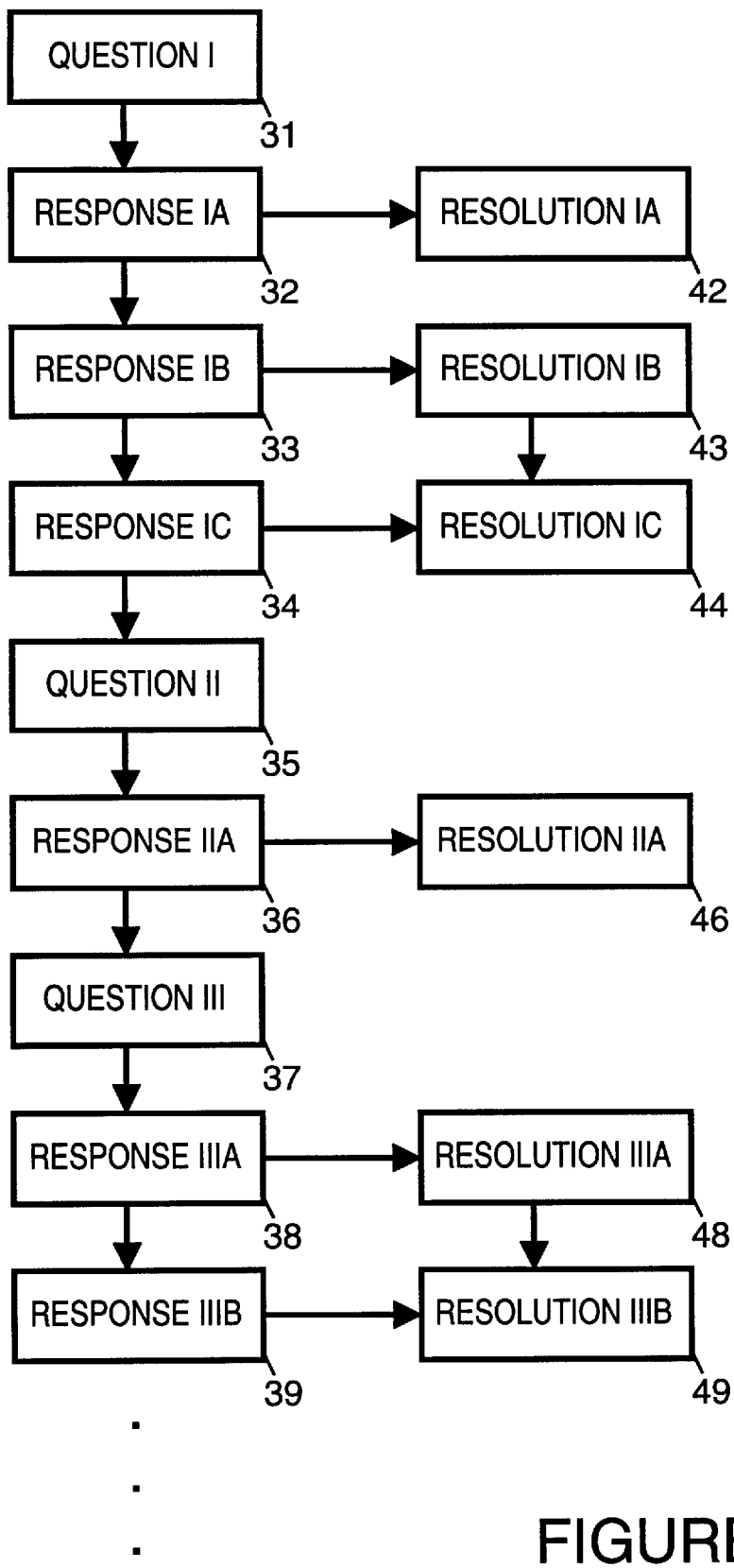
FIG. 2 illustrates the general structure of a diagnostic knowledge tree in accordance with a preferred embodiment of the present invention.

A sample structure of a diagnostic knowledge tree is shown in FIG. 2. Each leaf node of the diagnostic knowledge tree is composed of a question and the responses and fault resolutions for the question. For example, a first leaf node includes a question (I) 31, a response (IA) 32, a fault resolution (IA) 42 to response (IA) 32, a response (IB) 33, a fault resolution (IB) 43 to response (IB) 33, a response (IC) 34 and a fault resolution (IC) 44 to response (IC) 34.

A second leaf node includes a question (II) 35, a response (IIA) 36 and a fault resolution (IIA) 46 to response (IIA) 36. A third leaf node includes a question (III) 37, response (IIIA) 38, a fault resolution (IIIA) 48 to response (IIIA) 38, a response (IIIB) 39 and a fault resolution (IIIB) 49 to response (IIIB) 39.

As shown in FIG. 2, leaf nodes are linked together through their questions. The linking of leaf nodes, however, is not done directly but is reflected in the tree's statistical profile. This indirection allows the questions to be reordered based upon their actual likelihood of occurrence.

The leaf nodes are organized within diagnostic knowledge trees database 23 so that the most likely condition appears at the top, with the lesser-probability leaf nodes following after. Similarly, the matching responses for each leaf node appear in probability order, though they may be presented to the user as a list.

Leaf nodes may be logically moved from one point on a diagnostic knowledge tree to another, and responses may be logically re-ordered. Adjustments are based on probability scores, recalculated for every traversal of a diagnostic knowledge tree. Leaf ordering information is known as a statistical profile. The statistical profile indicates where all inter-node links for a diagnostic knowledge tree are stored.

Each client's statistical profiles is locally updated, with up-loads occurring infrequently. Once the collection of all client profiles arrive at the collection point within the vendor environment, they are statistically combined to arrive at a revised diagnostic master knowledge tree structural order—as reflected by the collective client statistical profile of the diagnostic knowledge tree.

Figure 3:
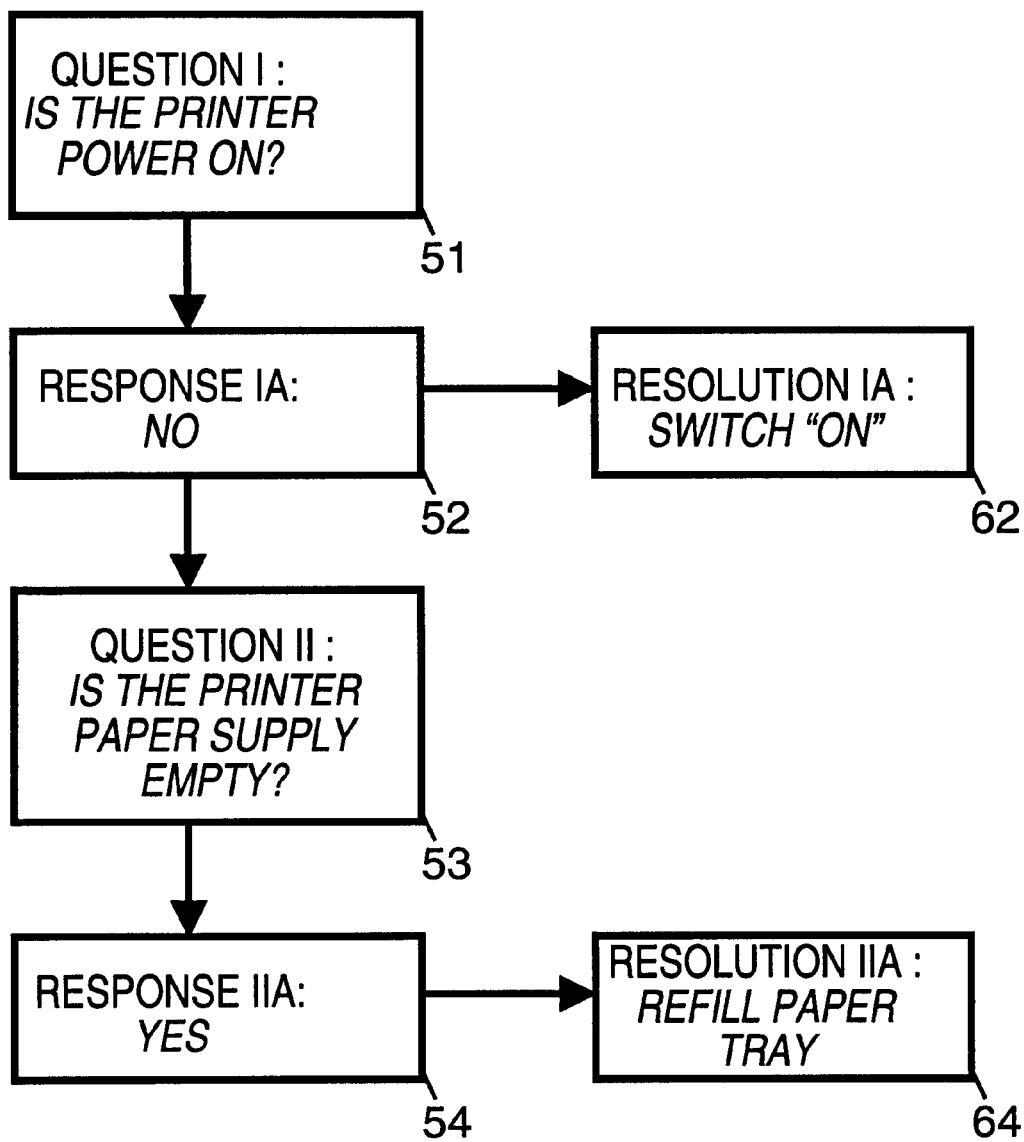
FIG. 3 gives a specific example of data stored within a diagnostic knowledge tree in accordance with a preferred embodiment of the present invention.

FIG. 3 shows an example of the types of questions, responses and fault resolutions which might be stored in a diagnostic knowledge tree for a printer failing to print. A question (I) 51 contains the question: "Is the printer power on?" A response (IA) 52 contains the response: "No". A fault resolution (IA) 62 contains the incident resolution: "Switch 'On'".

A question (II) 53 contains the question: "Is the printer paper supply empty?" A response (IIA) 54 contains the response: "Yes". A fault resolution (IIA) 64 contains the incident resolution: "Refill paper tray".

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for providing a facility for resolution of incidents that occur during use of products, the method comprising the following steps:
    (a) storing within a vendor environment a diagnostic knowledge trees database that stores diagnostic knowledge trees for the products;
    (b) downloading to a client environment, a copy of a subset of the diagnostic knowledge trees, the subset of diagnostic knowledge trees providing diagnostic information for a subset of the products that are supported within the client environment; and,
    (c) providing to a diagnostic program running within the client environment, by the copy of the subset of the diagnostic knowledge trees, diagnostic information for incidents that potentially occur when the diagnostic program attempts to analyze the subset of the products.

2. A method as in claim 1 wherein in step (a) leaf nodes within the diagnostic knowledge trees each include a question and at least one response.

3. A method as in claim 1 additionally comprising the following steps:
    (d) when diagnostic information provided by the copy of the subset of the diagnostic knowledge trees is not sufficient to solve a problem encountered by the diagnostic program, performing the following substeps:
        (d.1) forming a trouble ticket that describes the problem encountered; and,
        (d.2) forwarding the trouble ticket to a technical support system within the vendor environment.

4. A method as in claim 1 wherein in step (d) the following substeps are additionally performed when diagnostic information provided by the copy of the subset of the diagnostic knowledge trees is not sufficient to solve the problem encountered by the diagnostic program:
    (d.3) providing, by a vendor, a solution to the problem encountered; and,
    (d.4) updating the diagnostic knowledge trees database to reflect the solution provided by the vendor.

5. A method as in claim 1 additionally comprising the following step:
    (d) refreshing the copy of the subset of the diagnostic knowledge trees, including the following substep:
        (d.1) downloading from the vendor environment to the client environment changes made to the subset of the diagnostic knowledge trees.

6. A method as in claim 1 additionally comprising the following step:
    (d) refreshing the copy of the subset of the diagnostic knowledge trees, including the following substep:
        (d.1) downloading from the vendor environment to the client environment a new copy of the subset of the diagnostic knowledge trees.

7. A facility for resolution of incidents that occur during use of products, the facility comprising:
    a diagnostic knowledge trees database stored within a vendor environment, the diagnostic knowledge trees database storing diagnostic knowledge trees for the products; and,
    database storage within a client environment, the database storage storing a copy of a subset of the diagnostic knowledge trees, the subset of diagnostic knowledge trees providing diagnostic information for a subset of the products that are supported within the client environment, the database storage also providing, from the copy of the subset of the diagnostic knowledge trees, diagnostic information for incidents that potentially occur when a diagnostic program within the client environment attempts to analyze the subset of the products.

8. A facility as in claim 7 wherein the diagnostic knowledge trees include leaf nodes, the leaf nodes each including a question and at least one response.

9. A facility as in claim 7, wherein the facility additionally comprises:

update functionality for forming a trouble ticket that describes a problem encountered by a client and forwards the trouble ticket to a technical support system within the vendor environment, the trouble ticket being formed when diagnostic information provided by the copy of the subset of the diagnostic knowledge trees is not sufficient to solve the problem encountered by the client.

10. A facility as in claim 7 wherein update functionality is additionally for allowing a vendor to update the diagnostic knowledge trees database to reflect a solution provided by the vendor to the problem.

11. A facility as in claim 7, additionally comprising:

refreshing means for refreshing the copy of the subset of the diagnostic knowledge trees, the refreshing being done by downloading, from the vendor environment to the client environment, changes made to the subset of the diagnostic knowledge trees.

12. A facility as in claim 7, additionally comprising:

refreshing means for refreshing the copy of the subset of the diagnostic knowledge trees, the refreshing being done by downloading, from the vendor environment to the client environment, a new copy of the subset of the diagnostic knowledge trees.

13. A facility within a client environment, for resolution of incidents that occur during use of products, the facility comprising:

database storage within a client environment, the database storage storing a copy of a subset of diagnostic knowledge trees stored within a diagnostic knowledge trees database, the diagnostic knowledge trees database existing within a vendor environment, the subset of diagnostic knowledge trees providing diagnostic information for a subset of the products that are supported within the client environment, the database storage also providing, from the copy of the subset of the diagnostic knowledge trees, diagnostic information for incidents that potentially occur when a diagnostic program attempts to analyze the subset of the products; and, refreshing means for refreshing the copy of the subset of the diagnostic knowledge trees, so that the copy of the subset of diagnostic knowledge trees stored in the database storage is updated to reflect changes made to the subset of diagnostic knowledge trees stored in the diagnostic knowledge trees database.

14. A facility as in claim 13 wherein the diagnostic knowledge trees include leaf nodes, the leaf nodes each including a question and at least one response.

15. A facility as in claim 13, wherein the facility additionally comprises:

update functionality for forming a trouble ticket that describes a problem encountered by a client and for forwarding the trouble ticket to a technical support system within the vendor environment, the trouble ticket being formed when diagnostic information provided by the copy of the subset of the diagnostic knowledge trees is not sufficient to solve the problem encountered by the diagnostic program.

16. A facility as in claim 13 wherein update functionality allows a vendor to update the diagnostic knowledge trees database to reflect a solution provided by the vendor to the problem.

17. A facility as in claim 13, wherein the refreshing means refreshes the copy of the subset of the diagnostic knowledge trees by downloading, from the vendor environment to the client environment, changes made to the subset of the diagnostic knowledge trees.

18. A facility as in claim 13, wherein the refreshing means refreshes the copy of the subset of the diagnostic knowledge trees by downloading, from the vendor environment to the client environment, a new copy of the subset of the diagnostic knowledge trees.

* * * * *